(12) United States Patent
Hajati (10) Patent No.: US 10,671,166 B2
(45) Date of Patent: Jun. 2, 2020

(54) ELECTRONIC DEVICE INCLUDING HALBACH ARRAY BASED HAPTIC ACTUATOR AND RELATED METHODS

(71) Applicant: Apple Inc., Cupertino, CA (US)

(72) Inventor: Arman Hajati, San Mateo, CA (US)

(73) Assignee: APPLE INC., Cupertino, CA (US)

(*) Notice: Subject to any disclaimer, the term of this patent is extended or adjusted under 35 U.S.C. 154(b) by 321 days.

(21) Appl. No.: 15/659,235

(22) Filed: Jul. 25, 2017

(65) Prior Publication Data

US 2018/0059791 A1 Mar. 1, 2018

Related U.S. Application Data

(60) Provisional application No. 62/380,106, filed on Aug. 26, 2016.

(51) Int. Cl.
| | |
|---|---|
| G06F 3/01 | (2006.01) |
| H02K 33/02 | (2006.01) |
| H04M 19/04 | (2006.01) |
| H02K 33/16 | (2006.01) |
| G06F 1/16 | (2006.01) |
| H02K 11/22 | (2016.01) |
| H02K 11/215 | (2016.01) |

(52) U.S. Cl.
CPC .......... G06F 3/016 (2013.01); G06F 1/1626 (2013.01); G06F 1/1637 (2013.01); G06F 1/1684 (2013.01); H02K 33/02 (2013.01); H02K 33/16 (2013.01); H04M 19/047 (2013.01); H02K 11/215 (2016.01); H02K 11/22 (2016.01)

(58) Field of Classification Search
CPC ........ H02K 1/34; H02K 7/065; H02K 7/1876; H02K 7/1892

USPC ................ 310/12.01–12.33, 15–35
See application file for complete search history.

(56) References Cited

U.S. PATENT DOCUMENTS

| | | | | |
|---|---|---|---|---|
| 3,946,258 A | * | 3/1976 | Leshem | G21C 7/14 310/14 |
| 8,169,402 B2 | | 5/2012 | Shahoian et al. | |
| 10,158,278 B2 | * | 12/2018 | Mao | H02K 33/16 |
| 2002/0125773 A1 | * | 9/2002 | Lim | H02K 41/02 310/12.21 |
| 2009/0085558 A1 | * | 4/2009 | David | G01D 5/145 324/207.2 |

(Continued)

FOREIGN PATENT DOCUMENTS

| | | |
|---|---|---|
| WO | 2013169299 A1 | 11/2013 |
| WO | 2013169303 A1 | 11/2013 |

(Continued)

OTHER PUBLICATIONS

Product Specification Sheet: Geeplus, Vibro1 Vibration Actuator, 2 pages, www.geeplus.biz, downloaded on Jul. 15, 2015.

*Primary Examiner* — Quyen P Leung
*Assistant Examiner* — Minki Chang
(74) *Attorney, Agent, or Firm* — Allen, Dyer, Doppelt + Gilchrist, P.A. Attorneys at Law (57) ABSTRACT

An electronic device may include a haptic actuator. The haptic actuator may include a haptic actuator housing, at least coil carried by the haptic actuator housing, and a Halbach array of permanent magnets movable within the haptic actuator housing responsive to the at least one coil. The electronic device may also include a controller coupled to the at least one coil.

15 Claims, 10 Drawing Sheets

(56) References Cited

U.S. PATENT DOCUMENTS

| | | | |
|---|---|---|---|
| 2011/0169347 A1* | 7/2011 | Miyamoto | B06B 1/045 310/12.21 |
| 2014/0197936 A1 | 7/2014 | Biggs et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2015/0137624 A1* | 5/2015 | Wu | H02K 41/031 310/12.05 |
| 2018/0021812 A1* | 1/2018 | Akanuma | B06B 1/045 310/25 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

ELECTRONIC DEVICE INCLUDING HALBACH ARRAY BASED HAPTIC ACTUATOR AND RELATED METHODS

RELATED APPLICATIONS

The present application claims the priority benefit of provisional application Ser. No. 62/380,106 filed on Aug. 26, 2016, the entire contents of which are herein incorporated in its entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a haptic actuator. The haptic actuator may include a haptic actuator housing, at least one coil carried by the haptic actuator housing, and a Halbach array of permanent magnets movable within the haptic actuator housing responsive to the at least one coil. The electronic device may also include a controller coupled to the at least one coil.

The at least one coil may be adjacent a first side of the Halbach array of permanent magnets and may include at least one upper coil and at least one lower coil carried below the at least one upper coil. The at least one upper coil may be carried in offset relation to the at least one lower coil, for example. The at least one coil comprise a first coil and a second coil interleaved with the first coil.

The haptic actuator may include at least one flexure member coupling the Halbach array of permanent magnets to the actuator housing so that the Halbach array of permanent magnets is movable along an x-axis and in a z-axis direction within the haptic actuator housing responsive to the at least one coil. The controller may be configured to selectively drive the at least one coil so that the Halbach array of permanent magnets is movable in at least one of x-axis and z-axis directions, for example.

The haptic actuator housing may have first and second ends, and the haptic actuator may include first and second flexure members between the first and second actuator housing ends and adjacent portions of the Halbach array of permanent magnets, for example.

The controller may be configured to determine at least one of voltage and current, and drive the at least one coil based upon the at least one of voltage and current. The haptic actuator further includes a magnetic sensor carried by the haptic actuator housing and coupled to the controller, for example. The electronic device may further include a ferritic shield adjacent the Halbach array of permanent magnets.

A method aspect is directed to a method of making a haptic actuator. The method may include positioning at least one coil carried by a haptic actuator housing and positioning a Halbach array of permanent magnets movable within the haptic actuator housing to be responsive to the at least one coil.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
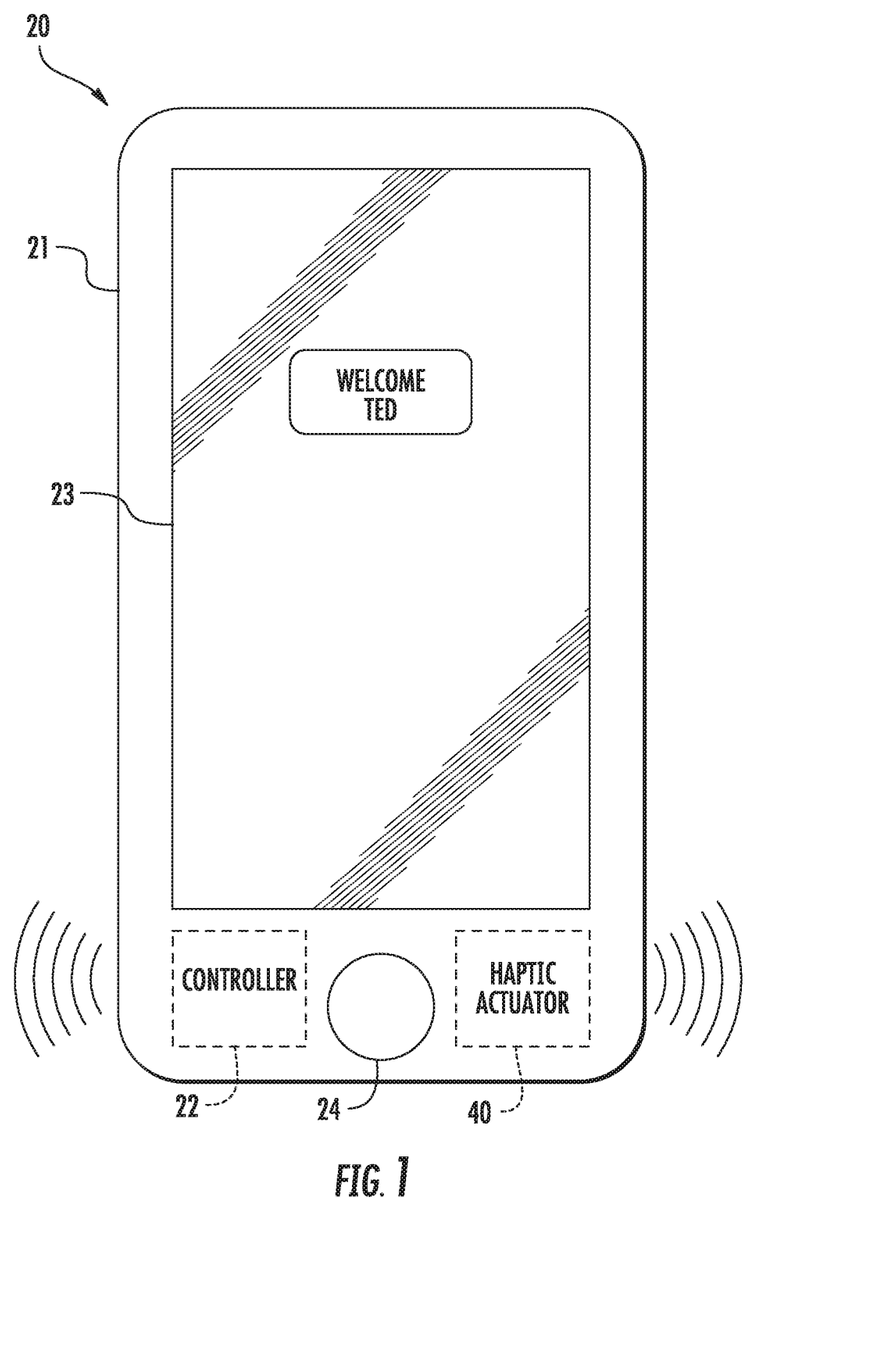
FIG. 1 is a perspective view of an electronic device including a haptic actuator according to an embodiment of the present invention.
Figure 2:
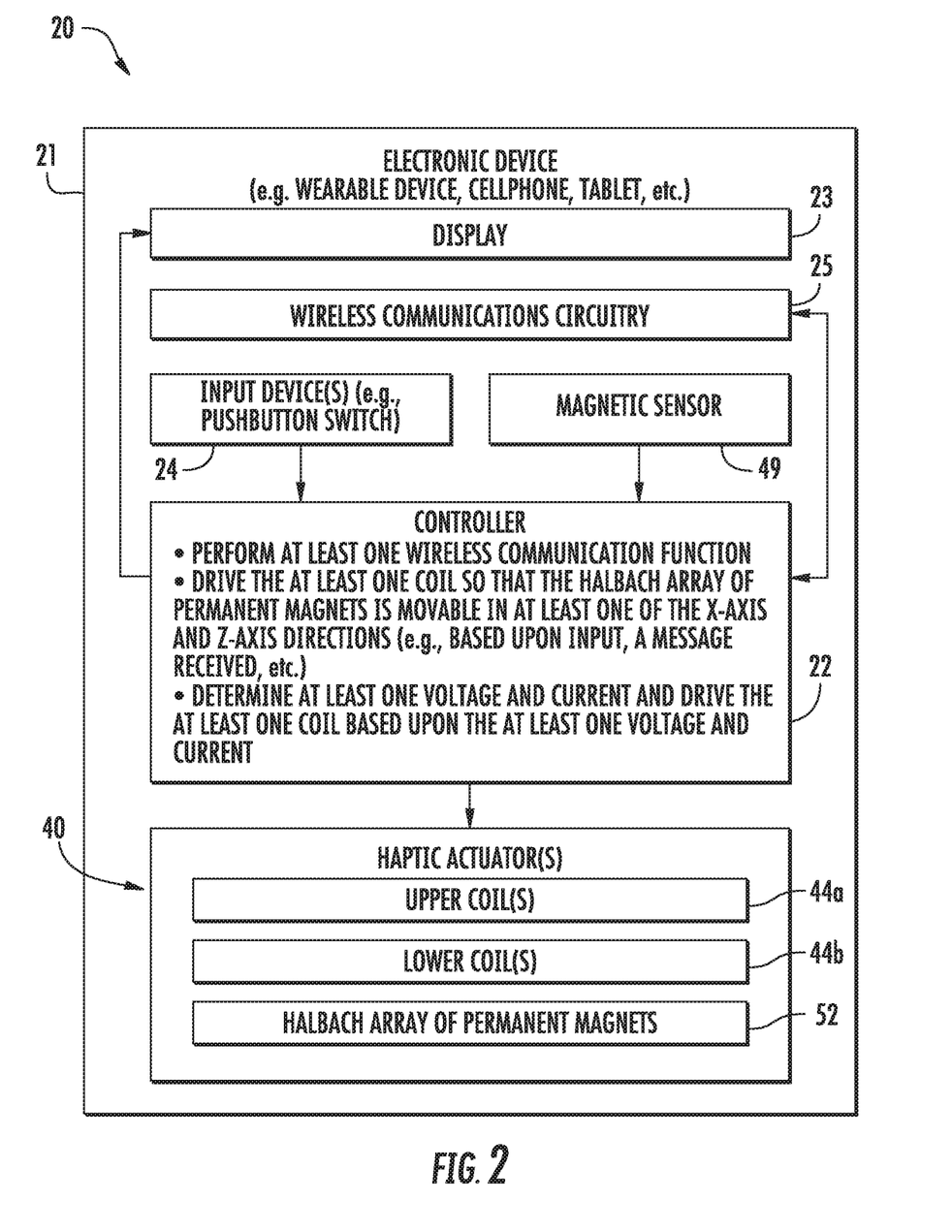
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a mobile telephone. The electronic device 20 may be another type of electronic device, for example, a wearable wireless communications device, and includes a band or strap for securing it to a user, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a light emitting diode (LED) display, for example, or may be another type of display, for example, a liquid crystal display (LCD) as will be appreciated by those skilled in the art. The display 23 may be a touch display, for example, responsive to user input.

A finger-operated user input device 24 illustratively in the form of a pushbutton switch is also carried by the device housing 21 and is coupled to the controller 22. The pushbutton switch 24 cooperates with the controller 22 to perform a device function in response to operation thereof. For example, a device function may include a powering on or off of the electronic device 20, initiating communication via the wireless communications circuitry 25, and/or performing a menu function. In some embodiments, there may not be a discrete finger-operated user input device 24 and/or when the display 23 is in the form of a touch screen display, the display may be a finger-operated input device.

Figure 3:
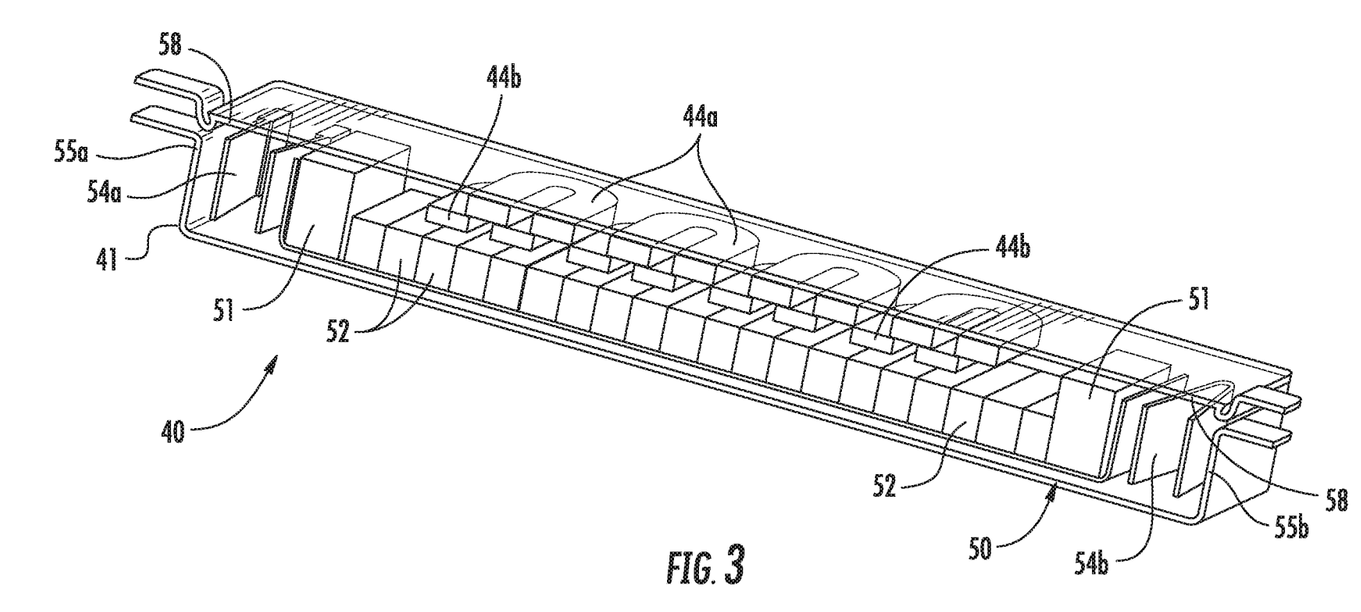
FIG. 3 is a detailed cut-away perspective view of the haptic actuator of FIG. 1.
Figure 4:
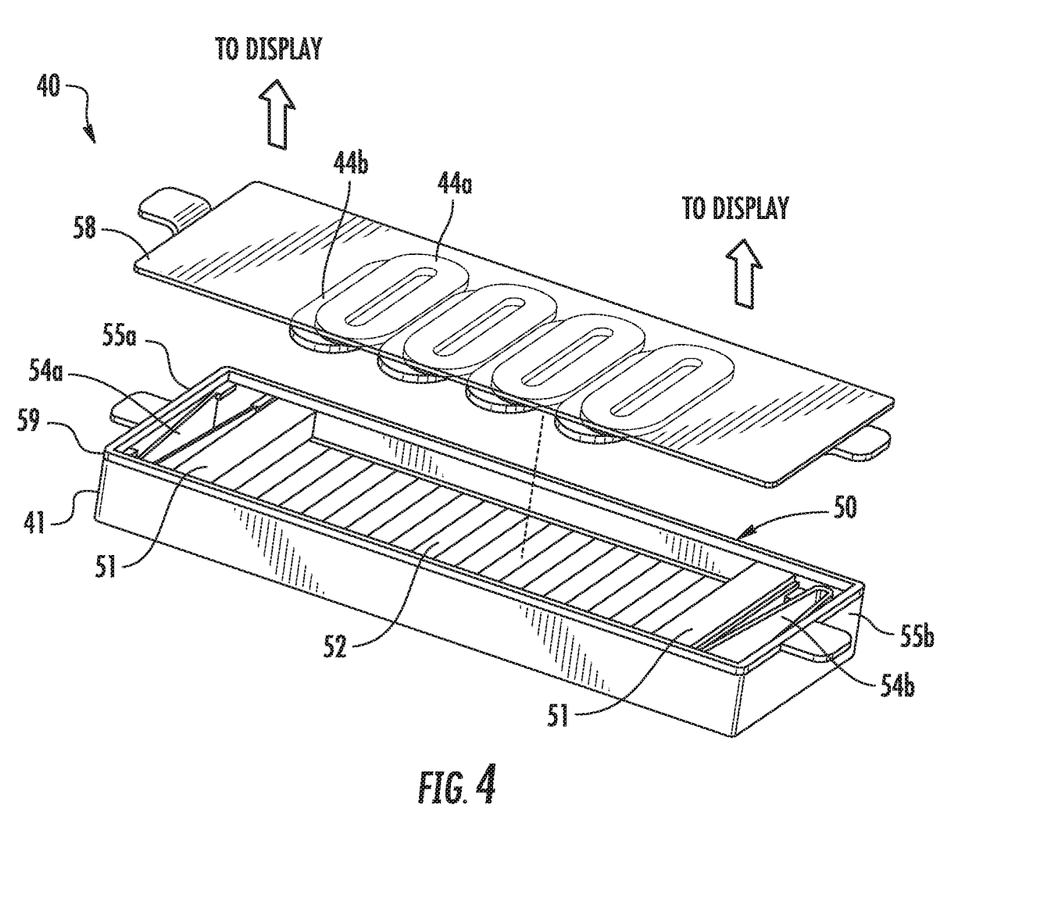
FIG. 4 is a detailed partial exploded view of the haptic actuator of FIG. 3.
Figure 5:
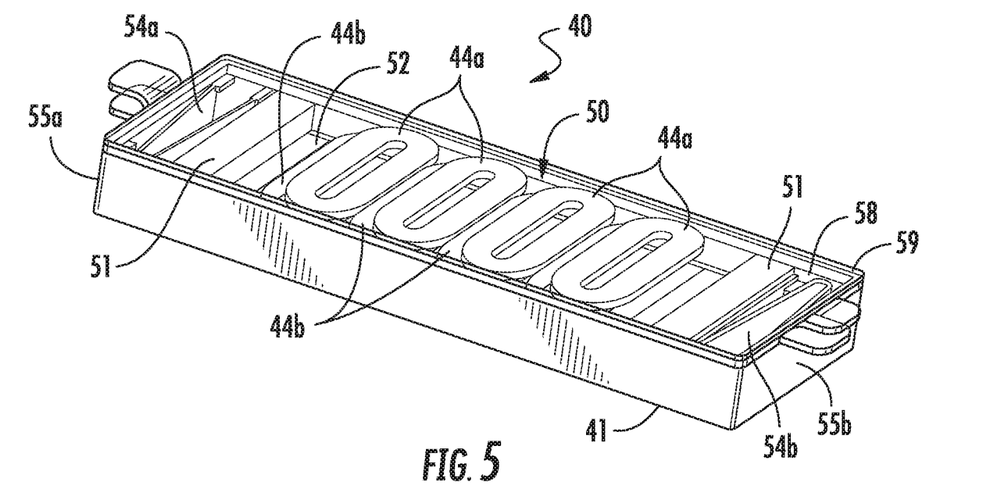
FIG. 5 is a detailed perspective view of the haptic actuator of FIG. 3.

Referring now additionally to FIGS. 3-5, the electronic device 20 illustratively includes a haptic actuator 40. The haptic actuator 40 is coupled to the controller 22, which determines user indications and operates the haptic actuator by way of applying power, current, or a voltage to coils 44a, 44b to move a field member 50 based upon the user indication. More particularly, the haptic actuator 40 cooperates with the controller 22 to provide haptic feedback to the user. The haptic feedback may be in the form of relatively long and short vibrations or "taps", particularly, for example, when the electronic device 20 is in the form of a wearable device and the user is wearing the electronic device. The vibrations may be indicative of a message received, and the duration of the vibration may be indicative of the type of message received. Of course, the vibrations may be indicative of or convey other types of information.

While a controller 22 is described, it should be understood that the controller 22 may include one or more of a processor and other circuitry to perform the functions described herein, and some or all of die circuitry may be carried by an actuator housing and/or by the device housing 21.

Further details of the haptic actuator 40 are now described. The haptic actuator 40 illustratively includes an actuator housing 41. An upper coil 44a and a lower coil 44b are each carried by the actuator housing 41 in offset relation to one another. In other words, the upper coil 44a is laterally offset from the lower coil 44b, for example, by a quarter pitch in offset. Of course, there may be more than two coils carried by the actuator housing 41. In some embodiments, the upper and lower coils 44a, 44b may be mounted directly to the layers of the display 23.

Figure 6:
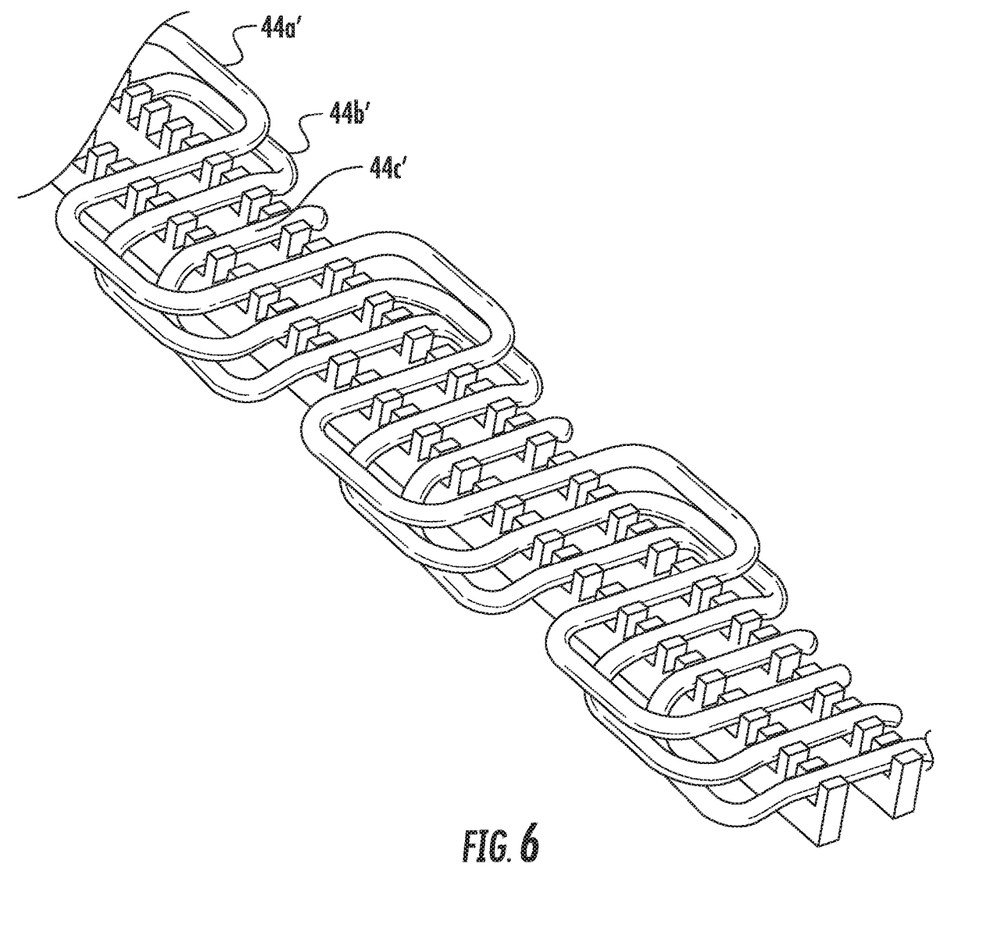
FIG. 6 is a perspective view of interleaved coils of a haptic actuator in accordance with an embodiment.

Referring briefly to FIG. 6, first, second, and third coils 44a', 44b', 44c' are interleaved. Thus the first, second, and third coils 44a', 44b', 44c' would be in the same z-axis plane, i.e., not offset in the z-axis direction. However, the first, second, and third coils 44a', 44b', 44c' may each be laterally offset, i.e., in the x-axis direction, for example, by half a pitch. The interleaved coils may increase efficiency.

Referring again to FIGS. 3-5, the field member 50 is movable within the housing 41 responsive to the upper and lower coils 44a, 44b. The movement of the field member 50, for example, in the x-axis direction and the z-axis direction creates the haptic feedback, or tapping, which may be localized, as will be appreciated by those skilled in the art and described in further detail below.

The field member 50 may include one or more masses 51 and may be shaped for a particular application or operation. The field member 50 also includes a Halbach array of permanent magnets 52 adjacent a first side of the upper and lower coils 44a, 44b. The Halbach array of permanent magnets 52 cooperates with the upper and lower coils 44a, 44b to provide movement of the field member 50 in either or both of the x-axis direction and the z-axis direction.

The haptic actuator 40 also includes biasing members 54a, 54b between respective first and second ends 55a, 55b of the actuator housing 41 and the field member 50. The biasing members 54a, 54b are illustratively in the form of flexure members for maintaining the field member, and more particularly, adjacent portions of the Halbach array of permanent magnets 52 suspended in the actuator housing 41. The flexure members 54a, 54b permit the field member including the Halbach array of permanent magnets 52 to be movable along the x-axis and z-axis directions within the haptic actuator housing 41 responsive to the upper and lower coils 44a, 44b. In other embodiments, the flexure members 54a, 54b may be in other forms, such as, for example, mechanical springs.

Typically, circuitry, for example, the controller 22, generates a sinusoidal drive waveform that drives the field member to move from an initial at-rest position, for example, in the x-axis direction. By way of cooperation between the Halbach array of permanent magnets 52 and the upper and lower coils 44a, 44b, the controller may drive the field member via the coils, for example, independently, to move also in the z-axis direction. In other words, the field member 50 has two degrees of freedom to permit the dual-axis driving. More particularly, the controller 22 may drive the field member 50 to provide localized z-axis feedback in addition to the typically x-axis feedback. The controller 22 may drive the field member in the x-axis direction independently from the z-axis direction or simultaneously in the z-axis direction. The two degrees of freedom of the field member 50 may be have different resonant frequencies associated therewith and, accordingly, for example, different functions. For example, the one of the x-axis or z-axis feedback may be a low frequency, long duration waveform (e.g., an alert vibe) while the other of the x-axis and z-axis feedback may be a more localized crisp (e.g., short duration), high frequency waveform.

More particularly, the Halbach array of permanent magnets 52 produces a single-sided periodic magnetic field, as will be appreciated by those skilled in the art. The Halbach array of permanent magnets 52 induces a magnetic field in the x-axis direction in one of the upper and lower coils 44a, 44b, and a magnetic field in the z-axis direction in the other of the upper and lower coils in nominal conditions, which results in a Lorentz force in the z-axis and x-axis directions, respectively. Therefore, the controller 22, by controlling the electrical current into the upper and lower coils 44a, 44b, can control both x-axis and z-axis forces.

Figure 7:
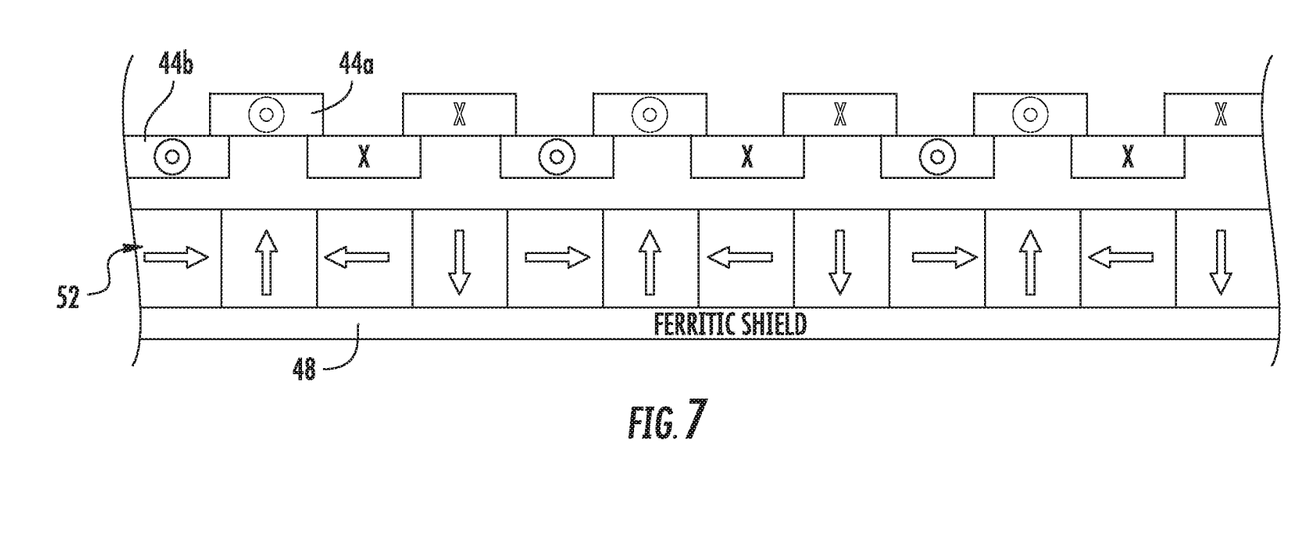
FIG. 7 is a schematic diagram illustrating field directions for creating the haptic feedback in both the x-axis and z-axis directions for a haptic actuator in accordance with an embodiment.
Figure 8A:
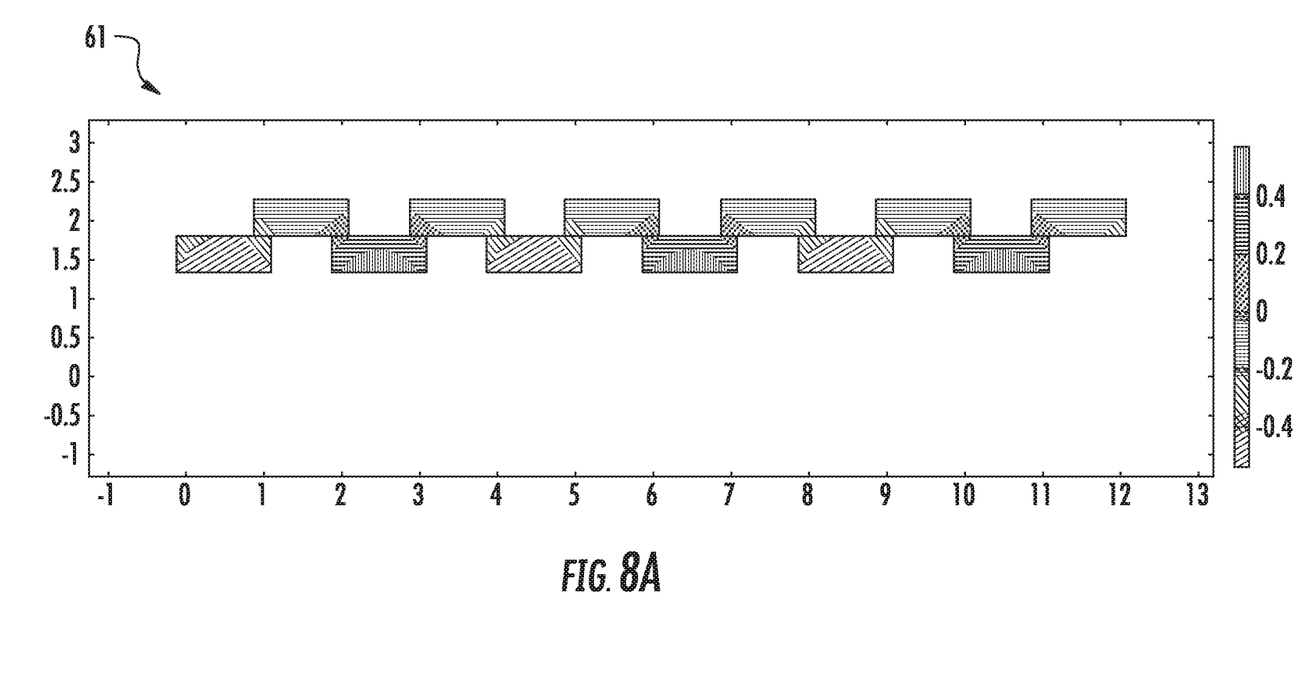
FIG. 8a is a graph illustrating the induced magnetic field in the upper and lower coils that generates movement in the z-axis direction in accordance with an embodiment.
Figure 8B:
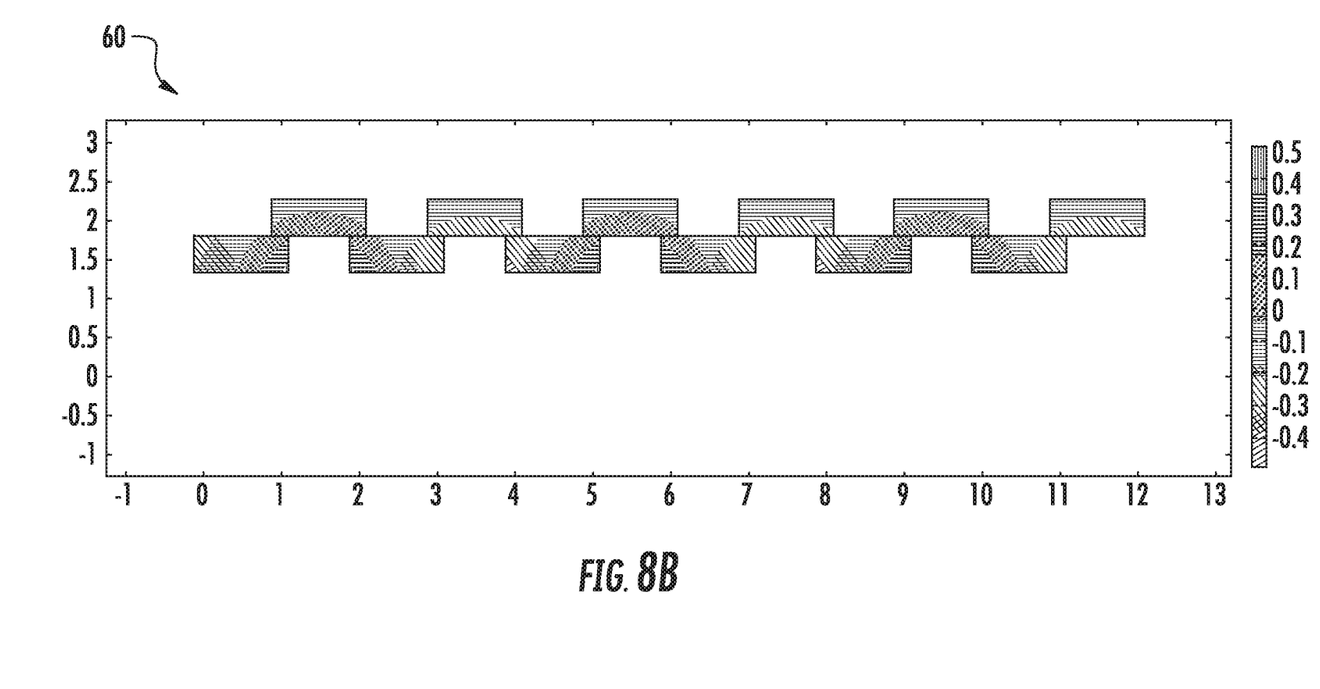
FIG. 8b is a graph illustrating the induced magnetic field in the upper and lower coils that generates movement in the x-axis direction in accordance with an embodiment.

FIG. 7 schematically illustrates field directions for creating the haptic feedback in both the x-axis and z-axis directions. With respect to the upper and lower coils 44a, 44b, "X" indicates the current being directed into the plane of the drawing (i.e., into the page) and a "circled dot" illustrates the current being directed out of the plane of the drawing (i.e., away from the page). With respect to the Halbach array of permanent magnets 52, the arrows indicate each magnet's magnetic field orientation. The graph 60 in FIG. 8a illustrates the induced magnetic field in the upper and lower coils 44a, 44b at the x=0 position that would generate movement in the z-axis direction. The graph 61 in FIG. 8b illustrates the induced magnetic field in the upper and lower coils 44a, 44b at the x=0 position that would generate movement in the x-axis direction.

The controller 22 may also generate position and velocity information regarding the field member 50. The position and velocity information may be obtained by a magnetic sensor 49 carried by the haptic actuator housing 41 and coupled to the controller 22. Position and velocity information may alternatively and/or additionally be obtained by an optical sensor, an acoustic sensor, and/or any other sensing device or technique for determining position and velocity information. The controller may also determine one or more of voltage and current, e.g. back electromotive force (BEMF), and drive the upper and lower coils 44a, 44b, and the field member 50, accordingly. The controller 22 may also drive the coils 44a, 44b or the field member 50 with dual frequencies (i.e. two-phase), for example, one to provide a softer x-axis feedback, and one to provide a stiffer z-axis feedback, as will be appreciated by those skilled in the art. Of course, other and/or additional waveforms having different characteristics may be used to drive the coils 44a, 44b and field member 50 with desired characteristics in either or both of the x-axis and z-axis directions.

Figure 9A:
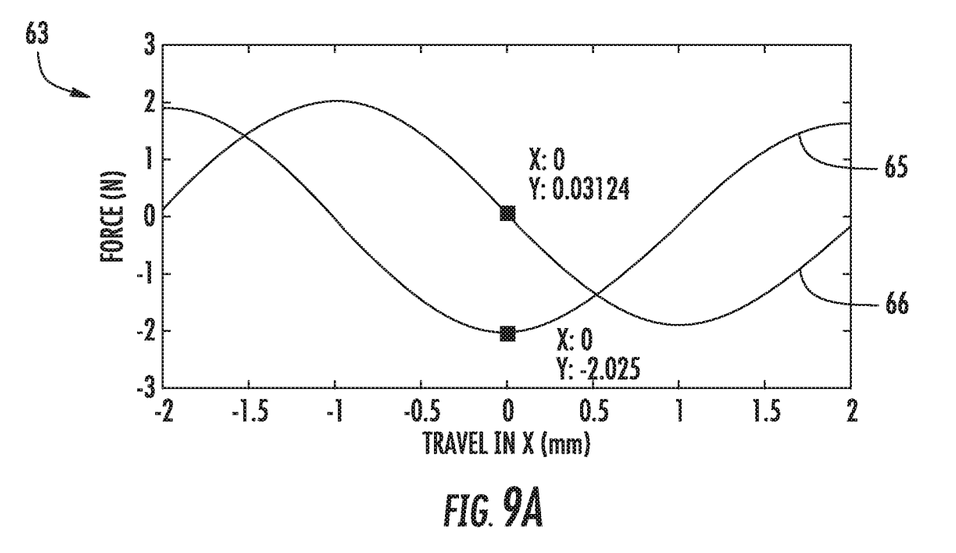
FIGS. 9a and 9b are graphs illustrating the Lorentz force generated by the lower and upper coils, respectively, by a haptic actuator in accordance with an embodiment.
Figure 9B:
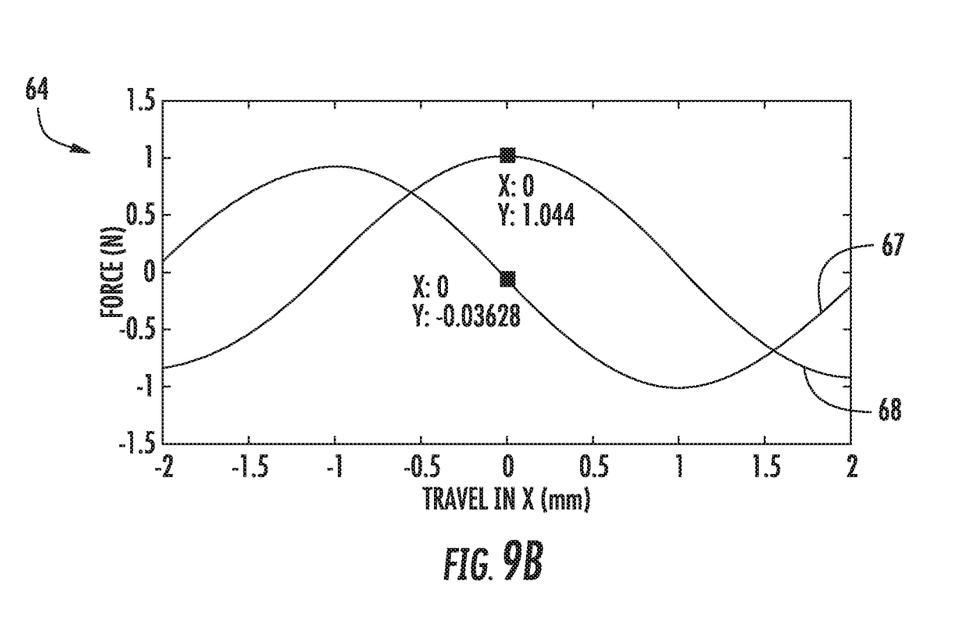

Referring now to the graphs 63, 64 in FIGS. 9a and 9b, the Lorentz force generated by the lower and upper coils 44b, 44a are illustratively shown. The graph 63 illustrates the Lorentz force in the lower coil 44b with respect to x-axis displacement. Forces in the x-axis direction 65 and y-axis 66 direction are illustrated. The graph 64 illustrates the Lorentz force generated in the upper coil 44a with respect to x-axis displacement. Forces in the x-axis direction 67 and y-axis 68 direction are illustrated.

The electronic device 20 also includes a ferritic shield 48 (FIG. 7) that is adjacent the field member 50, and more particularly, the Halbach array of permanent magnets 52. The haptic actuator 40 may exhibit reduced magnetic leakage through the back of the system, for example, by controlling the magnetic fields by way of the Halbach array 52 and coils 44a, 44b. There may also be reduced magnetic anti-spring compared to typical single axis haptic actuators.

The haptic actuator 40 may also include a cover 58 carried by the haptic actuator housing 41 adjacent a side of the upper and lower coils 44a, 44b that is opposite the Halbach array of permanent magnets 52. The cover 58 may be secured to the haptic actuator housing 41 via a seal 59, for example, a rubber gasket or other type of seal. In some embodiments, the cover 58 may be placed adjacent or below the display 23 of the electronic device 20 to provide haptic feedback through the display. For example, where the display 23 is a touch display, the haptic feedback may be localized, e.g., in the z-axis direction, at the location of the user input or touch.

In other embodiments, the haptic actuator 40 may include a Halbach array of permanent magnets 52 carried by the actuator housing 41, and the field member 50 may include upper and lower coils 44a, 44b that cooperate with the Halbach array of permanent magnets. In other words, in contrast to the embodiments described above, the Halbach array of permanent magnets 52 may be stationary (i.e., carried by the actuator housing 41) and the upper and lower coils 44a, 44b, as part of the field member 50 are moving (i.e., connected to the mass). Of course, there may be any number of coils and/or permanent magnets.

A method aspect is directed to a method of making a haptic actuator 40. The method may include positioning at least one coil 44a, 44b carried by a haptic actuator housing 41 and positioning a Halbach array of permanent magnets 52 movable within the haptic actuator housing to be responsive to the at least one coil.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a haptic actuator comprising
      a haptic actuator housing,
      at least one upper coil carried by the haptic actuator housing,
      at least one lower coil carried by the haptic actuator housing in offset relation to the at least one upper coil, and
      a Halbach array of permanent magnets movable within the haptic actuator housing responsive to the at least one upper and lower coils, the Halbach array of permanent magnets having a first side adjacent the at least one upper and lower coils; and
   a controller coupled to the at least one coil.

2. The electronic device of claim 1 wherein the haptic actuator comprises at least one flexure member coupling the Halbach array of permanent magnets to the actuator housing so that the Halbach array of permanent magnets is movable along an x-axis and in a z-axis direction within the haptic actuator housing responsive to the at least one coil.

3. The electronic device of claim 2 wherein the controller is configured to selectively drive the at least one coil so that the Halbach array of permanent magnets is movable in at least one of x-axis and z-axis directions.

4. The electronic device of claim 1 wherein the haptic actuator housing has first and second ends, and wherein the haptic actuator comprises first and second flexure members between the first and second actuator housing ends and adjacent portions of the Halbach array of permanent magnets.

5. The electronic device of claim 1 wherein the controller is configured to determine at least one of voltage and current, and drive the at least one coil based upon the at least one of voltage and current.

6. The electronic device of claim 1 wherein the haptic actuator further comprises a magnetic sensor carried by the haptic actuator housing and coupled to the controller.

7. The electronic device of claim 1 further comprising a ferritic shield adjacent the Halbach array of permanent magnets.

8. A haptic actuator comprising:
   a haptic actuator housing;
   at least one coil carried by the haptic actuator housing;
   a Halbach array of permanent magnets movable within the haptic actuator housing responsive to the at least one coil; and
   at least one flexure member coupling the Halbach array of permanent magnets to the haptic actuator housing so that the Halbach array of permanent magnets is movable along an x-axis and in a z-axis direction within the haptic actuator housing responsive to the at least one coil.

9. The haptic actuator of claim 8 wherein the at least one coil is adjacent a first side of the Halbach array of permanent magnets and comprises at least one upper coil and at least one lower coil carried below the at least one upper coil.

10. The haptic actuator of claim 9 wherein the at least one upper coil is carried in offset relation to the at least one lower coil.

11. The haptic actuator of claim 8 wherein the haptic actuator housing has first and second ends, and further comprising first and second flexure members between the first and second actuator housing ends and adjacent portions of the Halbach array of permanent magnets.

12. The haptic actuator of claim 8 further comprising a magnetic sensor carried by the haptic actuator housing.

13. A method of making a haptic actuator comprising:
positioning at least one upper coil carried by a haptic actuator housing;
positioning at least one lower coil carried by the haptic actuator housing and in offset relation to the at least one upper coil; and
positioning a Halbach array of permanent magnets movable within the haptic actuator housing to be responsive to the at least one upper and lower coils, the Halbach array of permanent magnets having a first side adjacent the at least one upper and lower coils.

14. The method of claim 13 further comprising coupling, using at least one flexure member, the Halbach array of permanent magnets to the actuator housing so that the Halbach array of permanent magnets is movable along an x-axis and in a z-axis direction within the haptic actuator housing responsive to the at least one coil.

15. The method of claim 13 wherein the haptic actuator housing has first and second ends, and further comprising positioning first and second flexure members between the first and second actuator housing ends and adjacent portions of the Halbach array of permanent magnets.

\* \* \* \* \*